United States Patent
Schwarz

(10) Patent No.: US 7,962,742 B2
(45) Date of Patent: Jun. 14, 2011

(54) INTERNET SECURE TERMINAL FOR PERSONAL COMPUTERS

(76) Inventor: Henry Samuel Schwarz, New York, NY (US)

( * ) Notice: Subject to any disclaimer, the term of this patent is extended or adjusted under 35 U.S.C. 154(b) by 977 days.

(21) Appl. No.: 11/359,915

(22) Filed: Feb. 22, 2006

(65) Prior Publication Data

US 2007/0198825 A1   Aug. 23, 2007

(51) Int. Cl.
H04L 29/06 (2006.01)
H04L 9/32 (2006.01)
G06F 7/04 (2006.01)
G06F 9/00 (2006.01)
G06F 11/00 (2006.01)

(52) U.S. Cl. ........ 713/151; 713/150; 713/152; 713/153; 713/159; 713/168; 713/170; 726/2; 726/3; 726/9; 726/12; 726/14; 726/15; 726/22; 726/26

(58) Field of Classification Search .......... 713/150–153, 713/155, 159–161, 168–170; 726/2–4, 9, 726/11–12, 14–15, 22, 26

See application file for complete search history.

(56) References Cited

U.S. PATENT DOCUMENTS

| | | | |
|---|---|---|---|
| 5,657,390 A | | 8/1997 | Elgamal et al. |
| 5,692,124 A * | 11/1997 | Holden et al. ............... 726/2 |
| 5,815,577 A | | 9/1998 | Clark |
| 6,400,823 B1 * | 6/2002 | Angelo ..................... 380/255 |
| 6,643,701 B1 * | 11/2003 | Aziz et al. ................. 709/227 |
| 6,687,836 B1 * | 2/2004 | Butler ........................... 726/7 |
| 6,694,436 B1 | | 2/2004 | Audebert |
| 6,772,331 B1 * | 8/2004 | Hind et al. ................ 713/151 |
| 6,834,271 B1 | | 12/2004 | Hodgson et al. |
| 2002/0087892 A1 * | 7/2002 | Imazu ....................... 713/202 |
| 2002/0166048 A1 * | 11/2002 | Coulier ..................... 713/169 |
| 2003/0188191 A1 * | 10/2003 | Aaron et al. ................ 713/201 |
| 2004/0030935 A1 * | 2/2004 | Kai ........................... 713/202 |
| 2004/0073795 A1 * | 4/2004 | Jablon ....................... 713/171 |
| 2005/0010786 A1 * | 1/2005 | Michener et al. .......... 713/185 |
| 2005/0066186 A1 * | 3/2005 | Gentle et al. .............. 713/193 |
| 2005/0108571 A1 | | 5/2005 | Lu et al. |
| 2006/0083228 A1 * | 4/2006 | Ong et al. .................. 370/389 |

OTHER PUBLICATIONS

Balfanz, D. et al. "Hand-Held Computers Can Be Better Smart Cards," Proceedings of USENIX Security '99, Washington, D.C., 1999.*
Ross, S.J., et al, "A Composable Framework for Secure Multi-Modal Access to Internet Services from Post-PC Devices," Proceedings of the Third IEEE WMCSA, Dec. 2000.*
Wu, Min et al, "Secure Web Authentication with Mobile Phones," DIMACS Workshop on Usable Privacy and Security Software, 2004.*
Oprea, A et al. "Securing a Remote Terminal Application with a Mobile Trusted Device," Jan. 17, 2005, Computer Security Applications Conference 2004, pp. 438-447.*

* cited by examiner

*Primary Examiner* — Hosuk Song
*Assistant Examiner* — Darren B Schwartz
(74) *Attorney, Agent, or Firm* — Gottlieb, Rackman & Reisman, P.C.

(57) ABSTRACT

A device which defends Internet (3) users against malware, inauthentic Internet (3) servers (4), counterfeit secure terminals (1), and other attacks. A secure terminal (1) is used as a PC local peripheral. SSL client software (8) executes on the secure terminal (1). Protocol software (7) and application software (6) which employ SSL execute on the secure terminal (1). Received server (4) certificates and their digital signatures are verified against values pre-loaded into the secure terminal (1). The user and the secure terminal (1) are mutually authenticated by passwords.

8 Claims, 11 Drawing Sheets

FIG. 1 – SSL Defense
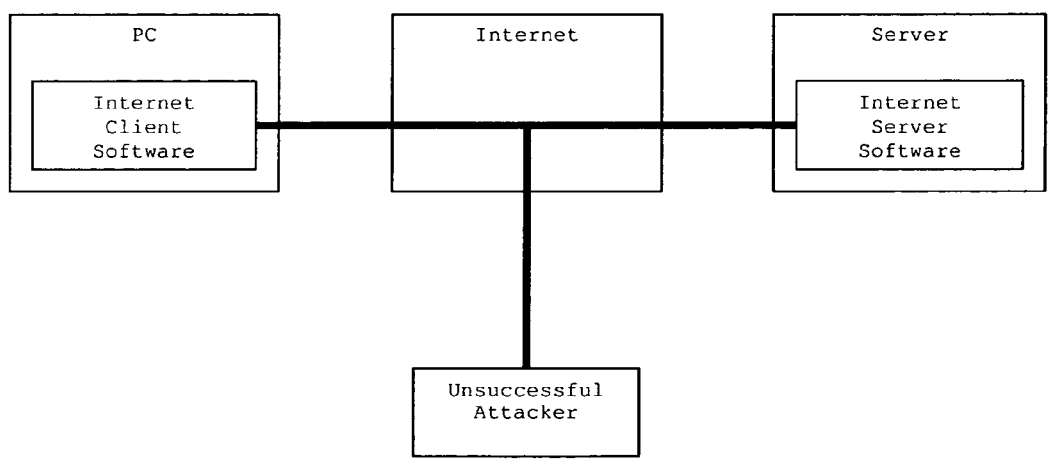
- PRIOR ART -

FIG. 2 - SSL No Defense
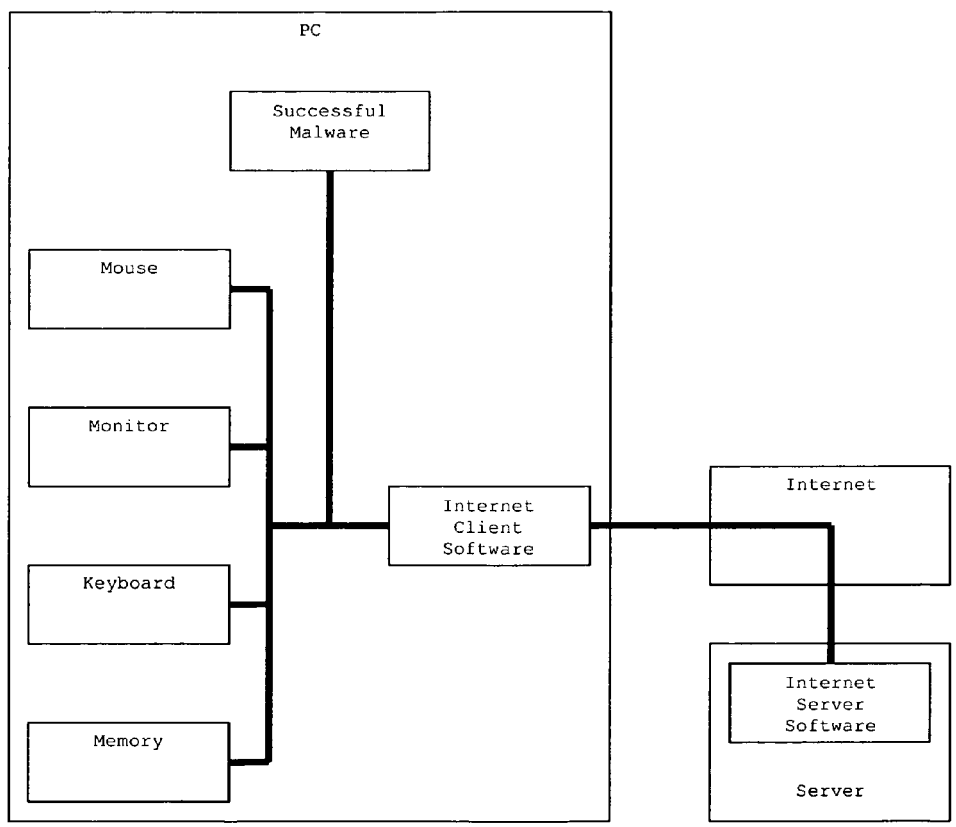
- PRIOR ART -

FIG. 3 - Man-In-The-Middle
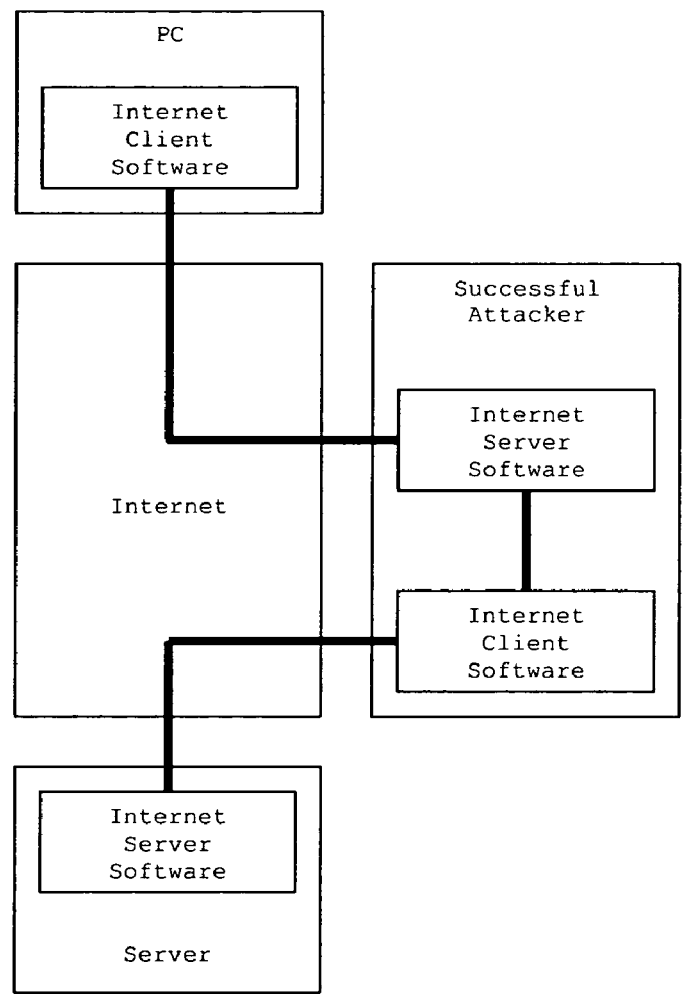
- PRIOR ART -

FIG. 4 - Secure Terminal As PC Local Peripheral
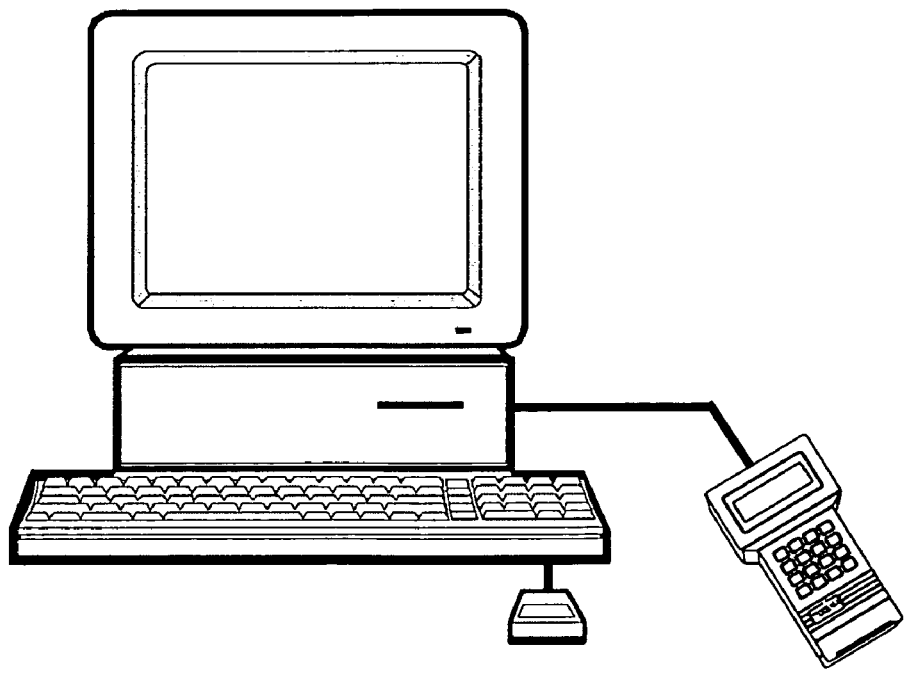
- PRIOR ART -

FIG. 5 - Local Peripherals
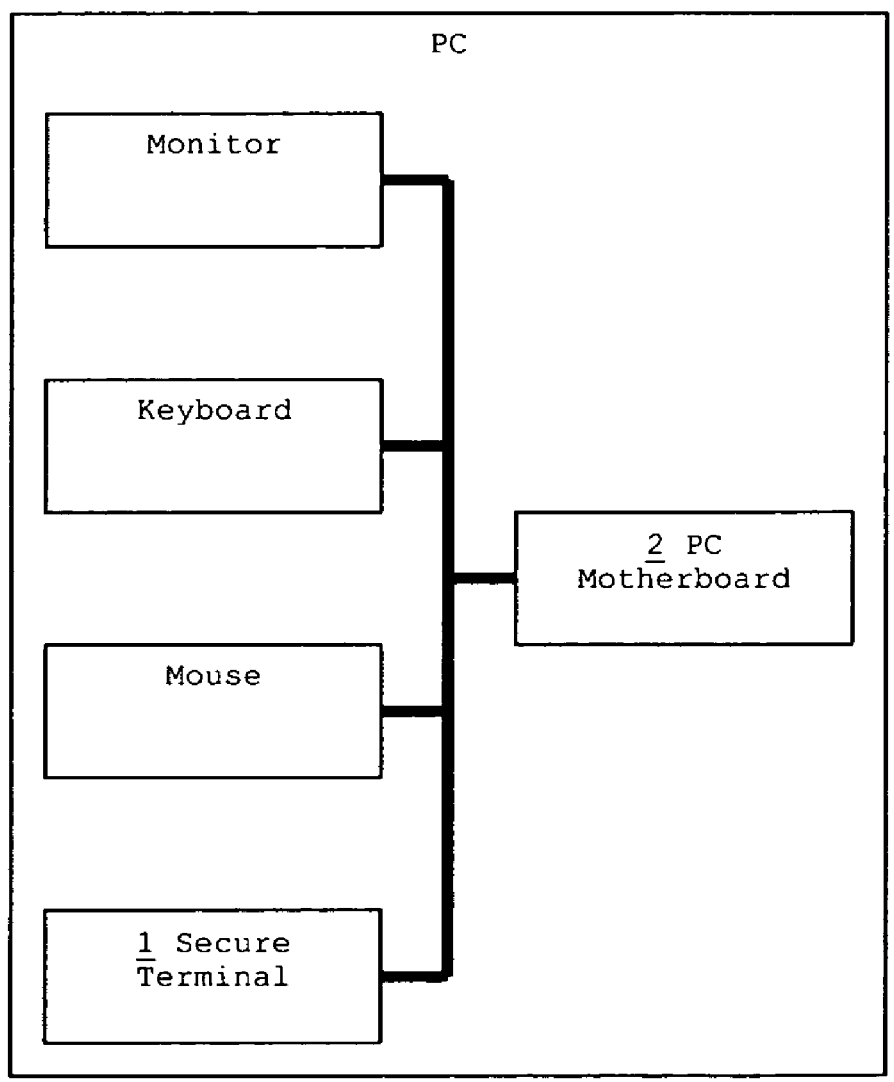

FIG. 6 - Overview
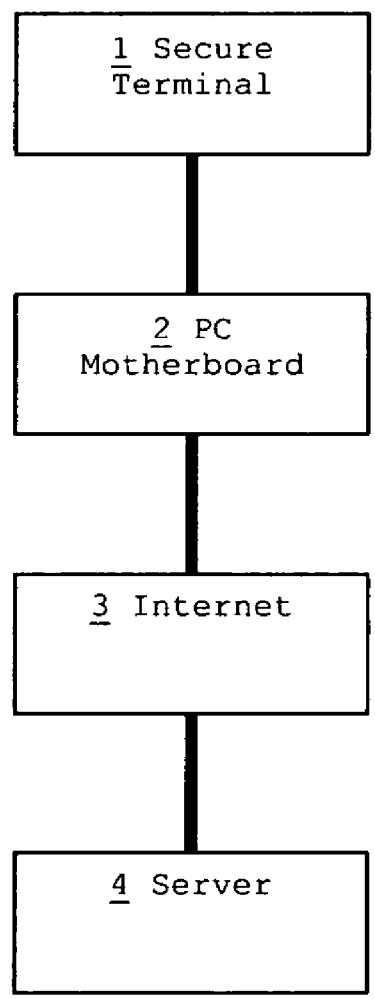

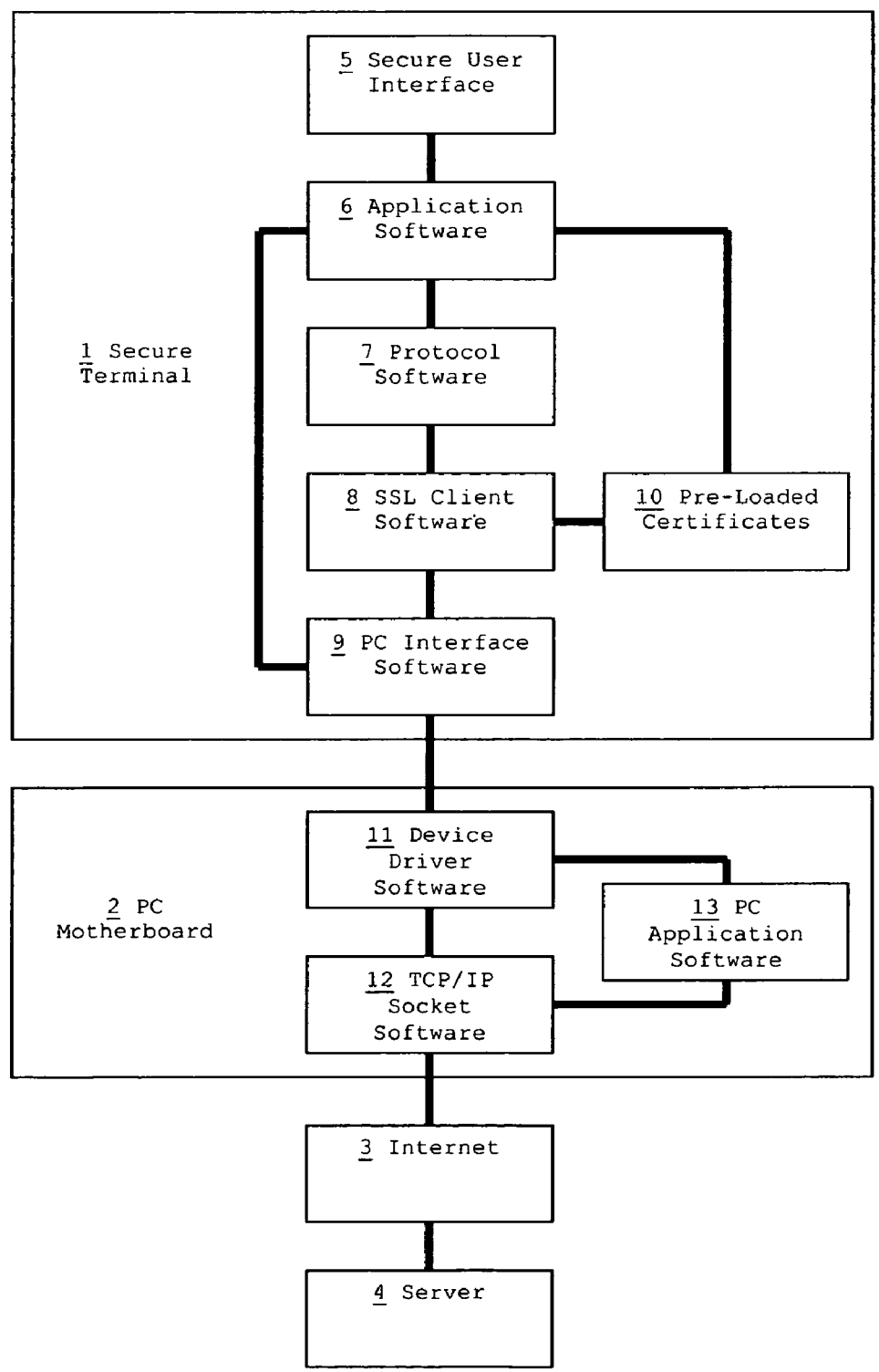
FIG. 7 - Secure Terminal And Motherboard Software

FIG. 8 - Internet Protocol And Internet Application Software
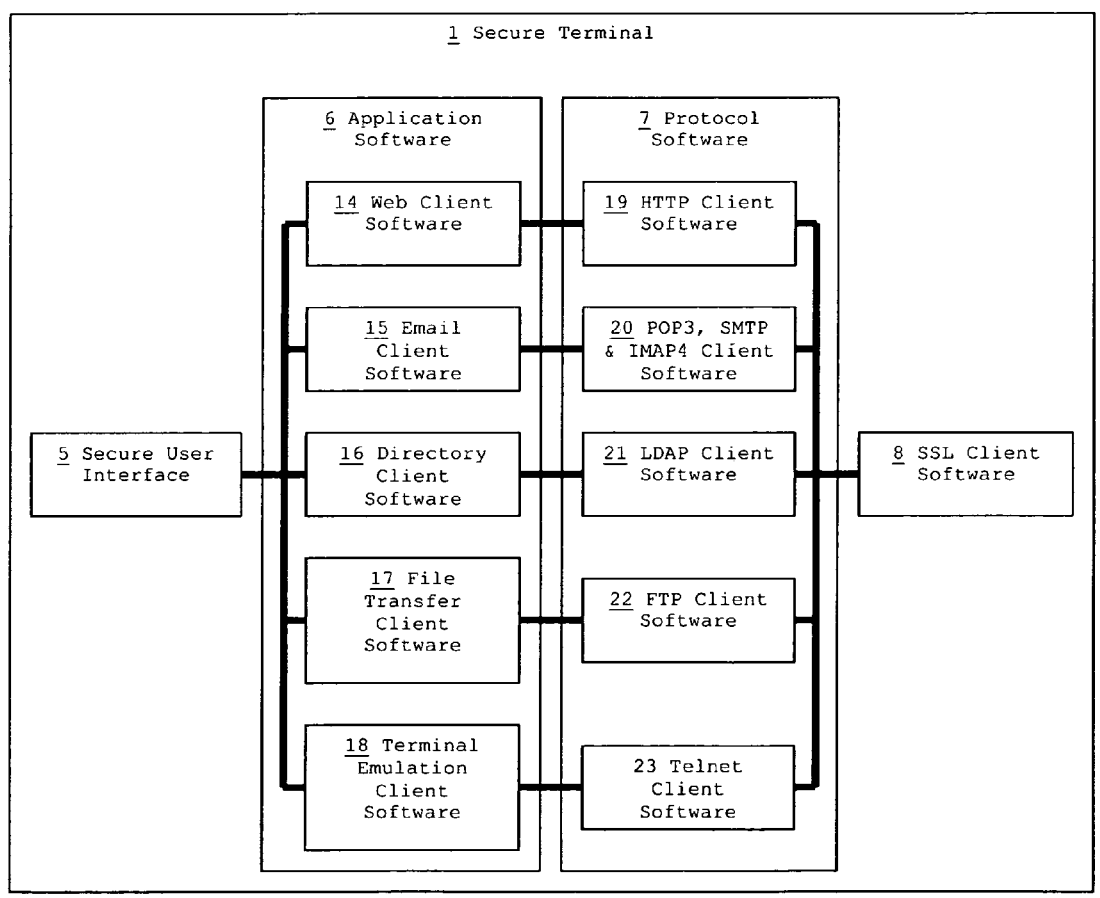

FIG. 9 - Web Client Software
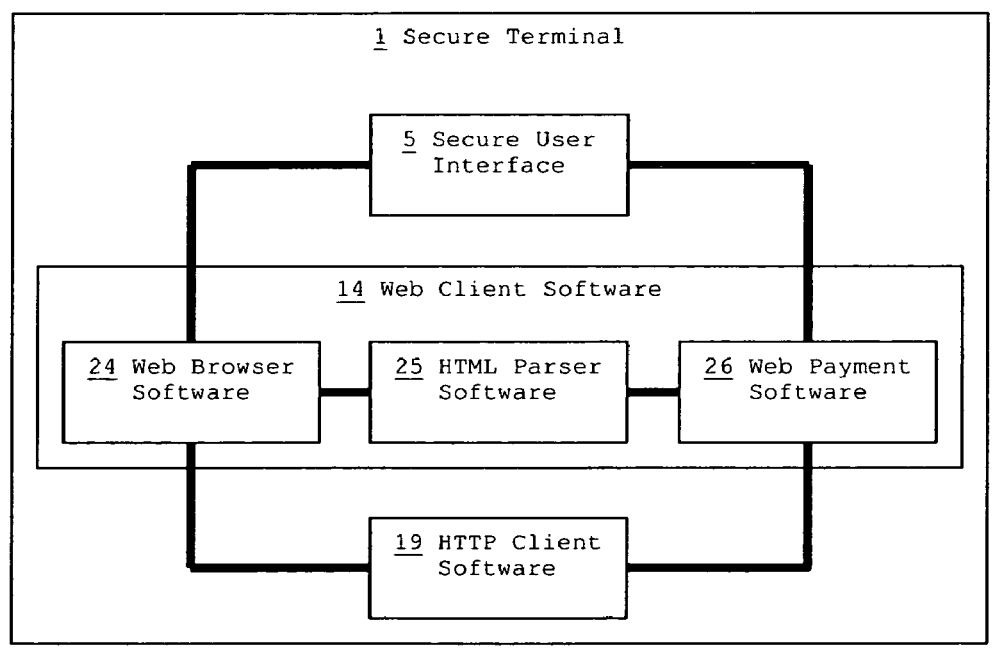

FIG. 10 - SSL Client Software
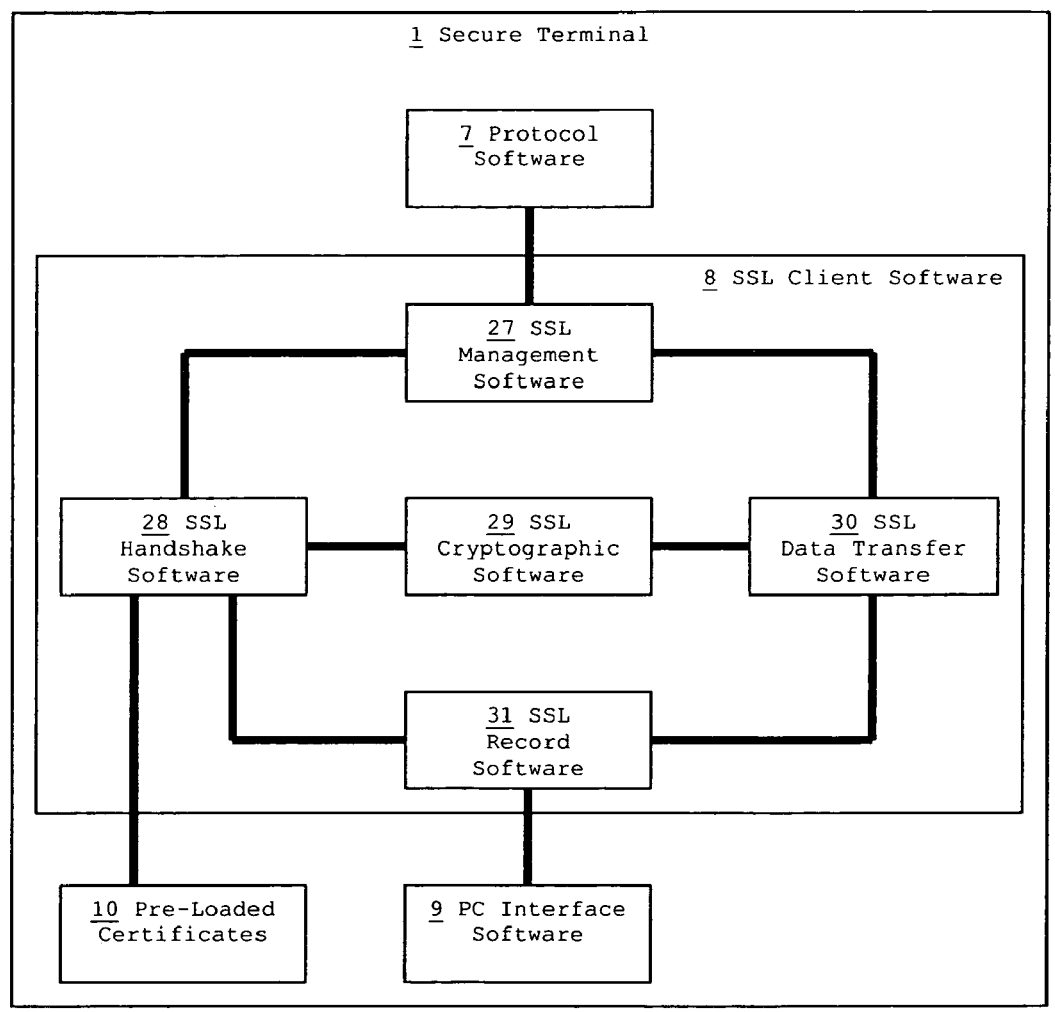

FIG. 11 - Offline Application Software
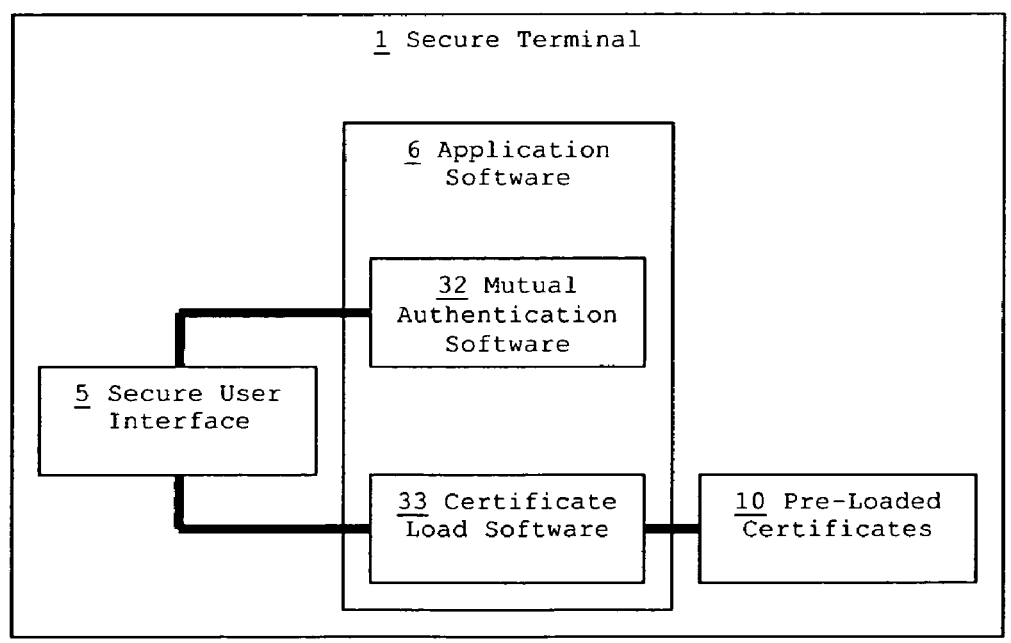

INTERNET SECURE TERMINAL FOR PERSONAL COMPUTERS

CROSS-REFERENCE TO RELATED APPLICATIONS

Not applicable.

FEDERALLY SPONSORED RESEARCH OR DEVELOPMENT

Not applicable.

SEQUENCE LISTING OR PROGRAM

Not applicable.

BACKGROUND OF THE INVENTION

1. Field of the Invention

This invention generally relates to Internet security, specifically to the use of a secure terminal to protect Internet users.

2. Background Art (a) Internet

The Internet is an interconnected system of networks that connects computers around the world via the TCP/IP protocol.

The world wide web, commonly referred to as the web, uses hypertext pages on the Internet.

As well as browsing the web, the Internet is used for a vast number of purposes such as emailing, online chatting, looking up directories, and transferring files.

A client/server architecture is often used on the Internet. The software executing on a user's personal computer is typically the client, and the software executing on the host computer is typically the server.

(b) Personal Computer

A personal computer (PC) is a small, relatively inexpensive computer designed for an individual user. A PC comprises a motherboard (which is based on a microprocessor), a power supply and local peripherals.

PCs are used by businesses and at home for purposes such as using the Internet, word processing, accounting, desktop publishing, keeping spreadsheets, managing databases, and playing games.

(c) Secure Sockets Layer

Data travelling over the Internet may pass through many different unknown and mistrusted computer systems, so there is often a requirement for end-to-end security of this data between a sender and a recipient. This security must offer privacy, authentication and integrity.

Most Internet software employs the SSL (Secure Sockets Layer) scheme to meet this security requirement.

For example, a web browser may use SSL to access a web page. When SSL is used by a web browser, the web page's address may begin with "https" (rather than the regular "http") and the web browser may display a padlock icon on the web browser's status bar.

SSL uses a client/server architecture. In the above example, the web browser is the SSL client and the web page host is the SSL server.

SSL divides a connection into two phases, the handshake phase followed by the data transfer phase. The handshake phase authenticates the server and optionally the client, and the handshake phase establishes the cryptographic information which is used to protect the payload data. During the data transfer phase, the payload data is broken up and sent as a series of cryptographically protected packets.

SSL is very successful at meeting this requirement to secure data between a sender and a recipient over the Internet. When Internet client software is executed on a user's PC, SSL defends data from attacks while the data travels over the Internet, as shown in FIG. 1 (SSL Defense).

Later versions of SSL are called TLS (Transport Layer Security, specified in RFC2246). SSL version 3.0 and TLS version 1.0 are very similar, and it is common to use the term SSL to denote both of these versions. This convention, using the term SSL to denote both SSL and TLS, is used herein. U.S. Pat. No. 5,657,390 to Netscape (1997) describes SSL.

(d) Certificates

SSL employs public key cryptography.

With public key cryptography, each party owns a public key and an associated private key. Public keys are made available to others, and private keys are kept secret by their owners.

To achieve privacy, a sender encrypts data using a recipient's public key, and the recipient decrypts it using the recipient's private key. To achieve authentication and integrity, a sender signs data using the sender's private key, and a recipient verifies it using the sender's public key.

When a public key is made available to others, the public key is contained within a certificate. The format of the certificates used by SSL is defined by X.509 (published by ITU-T, the International Telecommunication Union Telecommunication Standardization Sector) and RFC2459.

(e) Malware

SSL does not protect against malware which resides on an Internet user's PC. Malware is defined as malicious software or hardware. Examples of malware are viruses, spyware, trojan horses, and worms. The proliferation and success of malware is well documented.

When an Internet user enters private information into their PC, or when private information is displayed on the PC's monitor, or when a sensitive transaction is sent or received, in each of these cases the user's data is susceptible to eavesdropping or modification or some such attack by malware. When malware resides on an Internet user's PC, SSL does not defend against this malware's attacks, as shown in FIG. 2 (SSL No Defense).

Two examples of Internet client software are a web browser and an email client. A web browser may be used to enter a credit card number when paying for goods, or to enter a password to access an account, or to view an account's details, or to view a transaction's result. An email client may be used to enter a password or to compose and read emails. But in each of these cases, malware residing on the PC can eavesdrop on or modify the data, even if SSL is used between the Internet client software and the server.

For example, a PC Internet user may visit a retail web site, select goods to purchase, proceed to the web site's checkout, and enter their credit card number. When the credit card number is sent from the PC over the Internet to the payment server, SSL is used to defend against attacks which may be made as the credit card number travels over the Internet. However, malware residing on the PC may capture the credit card number as it is entered into the PC keyboard, or as it is displayed on the PC monitor, or at some other opportunity. The malware could then send the credit card number over the Internet to the attacker. SSL protects the credit card number as it travels over the Internet, but this malware attack takes place before SSL is applied.

To take another example, a PC Internet user may receive an email. When the email is sent from the server over the Internet to the PC, SSL is used to defend against attacks which may be made as the email travels over the Internet. However, malware residing on the PC may modify the email when it is stored on the PC's hard disk, or as it is displayed on the PC monitor, or at some other opportunity. The malware could change the email's text, date, or some other property. SSL protects the email as it travels over the Internet, but this malware attack takes place when SSL is no longer applied.

These malware attacks are beyond the scope of SSL's security objectives. SSL is designed to protect data as it travels over the Internet, but not before or afterwards.

Some web sites try to defend against such attacks by having their users enter passwords by mouse clicking on a virtual keyboard displayed at random locations on the PC's monitor. This does defend against malware which specifically targets the PC's keyboard, but does not defend against malware, for example, which upon every mouse click captures a graphical image of whatever is displayed on the PC's monitor and then emails these "screen shots" to the attacker.

Other web sites try to defend against these malware attacks by demanding that their users always execute anti-virus software. Though, as is constantly reported in the news media and other publications, malware is very often successful in spite of anti-virus software.

In the broadest sense, it is theoretically possible for malware on a PC to penetrate the inner workings of any Internet software executing on that PC, even if the Internet software uses SSL when sending or receiving over the Internet. Malware can read from or write to the memory areas used by the Internet software, or read from or write to local peripheral devices such as the PC's keyboard, mouse or monitor. This allows malware to perpetrate virtually any imaginable security breach.

(f) Man-in-the-Middle

Internet software using SSL is also susceptible to an attack known as "man-in-the-middle". The attacker clandestinely redirects the Internet client software to communicate with the attacker's server, and the attacker (as the client) also communicates with the legitimate server. The attacker passes through data to and from the Internet client software and the legitimate server, but the attacker may also eavesdrop on or modify the data. The elements of a man-in-the-middle attack are shown in FIG. 3 (Man-In-The-Middle).

The use of SSL by the Internet client software and by the legitimate server is no defense against man-in-the-middle. SSL protects the data as it travels over the Internet between the client and the attacker, and SSL protects the data as it travels over the Internet between the attacker and the legitimate server, but SSL is not applied when the data passes through the attacker's computer. So the attacker is free to read private data such as a password or a credit card number, and the attacker is free to corrupt sensitive data such as a transaction amount or the text of an email.

A possible defense against man-in-the-middle is to pre-load an SSL certificate onto the PC. However, as is explained below (in the sub-section entitled "Pre-Loading SSL Certificates Onto A PC"), this defense is thwarted by malware or by the attacker purchasing a legitimate certificate.

Another possible defense against man-in-the-middle is for the Internet client software to verify the server's address contained within the server's SSL certificate. However, the attacker's malware may modify data on the Internet client's PC such that the attacker's server's address is verified.

(g) Counterfeit Servers

An attacker may direct a user to a fraudulent server which emulates a legitimate server. The unsuspecting user may deliver private data to the attacker, such as entering their password or other private data at a fraudulent web site.

This misdirection may be achieved by methods such as a "phishing" email (in which case the fraudulent server typically hosts web pages), or by "DNS spoofing", or by malware which surreptitiously modifies the server's name or address.

This attack may be further concealed by other malware activity, such as changing the address which is displayed in a web browser's address field from the counterfeit server's address (which is actually being used) to the correct address (which is not being used).

Currently, the major defense offered by Internet service providers is to vocally warn their customers to be careful of such impostors. This is clearly an inadequate defense.

A possible defense against counterfeit servers is to pre-load an SSL certificate onto the PC. However, as is explained below (in the sub-section entitled "Pre-Loading SSL Certificates Onto A PC"), this defense is thwarted by malware or by the attacker purchasing a legitimate certificate.

Some Internet service providers have tried offering hardware tokens to their customers to defend against these fraudulent servers. These hardware tokens contain secret information known only by the legitimate server, so they may be used to authenticate the server. However, these schemes involving hardware tokens remain susceptible to man-in-the-middle attacks.

(h) Pre-Loading SSL Certificates Onto a PC

In order to defend against inauthentic servers (either man-in-the-middle or counterfeit servers), Internet client software executing on a PC motherboard may pre-load a CA's (certificate authority's) SSL certificate. For example, certificates from various CAs are included in the installation of the Microsoft Windows operating system. A pre-loaded CA SSL certificate may then be used to authenticate another SSL certificate which is received during an SSL handshake.

However, it is easy to purchase a certificate which is signed by a reputable CA. An attacker may do so, thereby obtaining a certificate which would be deemed authentic by the Internet client software. The attacker could implement an inauthentic server which uses this purchased certificate.

An alternate defense against inauthentic servers is for the Internet client software to safely obtain a copy of the legitimate server's SSL certificate, such as on a CD by post, and to only use that particular certificate when attempting to communicate with that particular server.

However, an SSL certificate (either a CA's SSL certificate or a server's SSL certificate) which is pre-loaded onto a PC is susceptible to malware (as is any data loaded onto a PC). For example, an attacker's malware may store a bogus certificate as if it were a pre-loaded certificate, and the attacker could then implement an inauthentic server which uses this bogus certificate.

(i) PC Local Peripherals

A local peripheral is a device which is a sub-component of a PC and which interfaces with a PC's motherboard by a short connection. This short connection may be a cable, connector, plug & socket, or wireless link.

For example, a PC's local peripherals may be a keyboard, mouse, monitor, hard disk, CD drive, modem, printer, speakers, microphone, camera and touchpad.

Short connections to monitors are graphics interfaces such as VGA, XGA and SVGA.

Short connections to internal disk drives generally use the various ATA (Advanced Technology Attachment) interfaces such as IDE.

An expansion board may connect to a motherboard using bus standards such as PCI or ISA. An expansion board may itself be a local peripheral (such as a modem card) or it may be part of a local peripheral by using a short connection to other hardware (such as an audio card which has a socket for a speaker cable plug).

Where a local peripheral is integrated into a PC case, such as a keyboard and a touchpad in a notebook PC, the technology used for the short connection is determined by the PC manufacturer.

Aside from monitors, internal disk drives, expansion boards, and devices which are integrated into a PC's case, the most common short connections to local peripherals are:

USB (Universal Serial Bus)
EIA-232 (Electronic Industries Alliance) commonly referred to as RS-232C or serial
PS/2 (IBM Personal System/2)
Parallel, which may be Centronics, EPP, ECP or SCSI
PCMCIA
Bluetooth wireless
27 MHz wireless
IEEE-1394 (Institute of Electrical and Electronics Engineers) commonly referred to as FireWire It is not conventional to use the TCP/IP protocols to connect a local peripheral to a PC motherboard. If TCP/IP is used to connect a device to a PC motherboard, then the device is autonomous and stand-alone and is not a PC local peripheral. In this case, the device and the PC motherboard are different TCP/IP nodes with different IP addresses.

(j) Secure Terminals

A regular "computer terminal" is a device which provides a user interface, such as a keyboard and a display screen, and is able to communicate with another device. A "secure terminal" provides the same functionality but with security, and is expressly designed to keep a user's information private and to ensure the integrity and authenticity of all data. A secure terminal is extremely resistant to attacks by malware, and in general is able to perform cryptographic operations.

Secure terminals are used in many contexts, very commonly for a customer to enter their PIN (personal identification number) at a retail point of sale.

To be classified as a secure terminal, the device must meet security criteria which may include:

Provide resistance to attempts to tamper with the device, protecting against drills, lasers, chemical solvents, splitting the case along its seams, entry via ventilation openings, etc.
Detect attempts to tamper with the device, and upon such attempts automatically erase all sensitive information contained within the device and render it inoperative.
The keyboard circuitry is inaccessible to external probes or other eavesdropping equipment which could capture a user's keystrokes.
The device's security systems remain intact when exposed to extreme environments such as low temperatures or high voltages.
A strictly controlled technique must be used to change the device's software or to read from or write to the device's memory.

These security criteria combine to prevent the installation of malware on a secure terminal.

For example, malicious spyware software may easily be installed on a regular PC because regular PCs are designed to be open platforms which execute any software. But a secure terminal is designed to be a closed platform upon which only authorized software may be installed using techniques such as digital signatures or passwords. So unauthorized spyware software may not be installed on a secure terminal.

To take another example, malicious spyware hardware may easily be installed on a regular PC because regular PCs offer no defenses against such hardware. It is straightforward to hide mechanical probes under the keys on a PC keyboard, or to mount a hardware keystroke logger on a PC keyboard cable. But a secure terminal is designed to have a protected keyboard with countermeasures such as physically shielded keys or membrane keys.

There are various regulations and standards for secure terminals, such as Visa and MasterCard's "Payment Card Industry POS PIN Entry Device Security Requirements Manual", and the International organization for Standardization's "ISO 13491", and the USA National Institute of Standards and Technology's "FIPS 140-2". Different secure terminals meet different requirements.

Different names are used for secure terminals, depending on the industry and the context and on the precise functionality of the device. These names include PIN-pad, pinpad, EPP (encrypting PIN-pad), SPED (secure PIN entry device), PED (PIN entry device), cryptographic module, TCU (terminal cryptographic unit), SCD (secure cryptographic device), TRSM (tamper resistant security module), and smart card reader.

The malicious attack on secure terminals which historically has been the most difficult to defend against is that of a counterfeit secure terminal. The attacker surreptitiously swaps a user's secure terminal with the attacker's counterfeit secure terminal. This rogue secure terminal appears to behave identically to the legitimate secure terminal, but in fact it delivers the user's private information to the attacker. A variation on this attack is to use the legitimate secure terminal's exterior plastic case but to surreptitiously replace some of the electronics within. Another variation is to somehow breach the secure terminal's defenses and to load new software into the secure terminal.

(k) Secure Terminals as PC Local Peripherals

As shown in FIG. 4 (Secure Terminal As PC Local Peripheral), a secure terminal may be connected to a PC motherboard as a local peripheral.

The secure terminal may provide a user interface (such as a keyboard and display screen) which is resistant to malware, and may also provide a card reader/writer for smart cards (IC cards) or magnetic stripe cards.

There are several enterprises supporting this use of a secure terminal as a PC local peripheral.

FinRead specifies an open platform upon which software for a smart card scheme may be developed to execute on a PC motherboard and to execute on a compliant secure terminal. The PC/SC Workgroup specifies an open platform upon which software for a smart card scheme may be developed to execute on a PC motherboard.

The scope of both FinRead and the PC/SC Workgroup is limited to the specification of open platforms for software development of smart card schemes.

EMV is a smart card scheme which is being widely adopted worldwide. An EMV compliant secure terminal may be connected to a PC motherboard and an EMV smart card may then be used to pay for goods over the Internet or to access a bank account over the Internet. The EMV specifications detail particular implementations of operations such as PIN encipherment, cryptographic key management, file transfer and financial transactions.

The scope of EMV is limited to payments and related financial transactions, with no real provision for other applications.

Some organizations (such as Kryptosima, FreeStar Technology, EyeCashNetworks, Innovonics and CASPay) offer services for card payments over the Internet using a secure terminal. These secure terminals are used for reading a card's magnetic stripe, or for entering a PIN, or for authenticating a message.

The scope of these card payment services is limited to payment transactions. Furthermore, these card payment services require a web merchant to invest in changes to the merchant's server's infrastructure by installing or connecting to the card payment service's server system. Furthermore, these card payment services perform some sensitive aspects of financial transactions on the user's regular PC, not on a secure terminal, such as displaying a transaction authorization number, so those aspects remain vulnerable to malware or to inauthentic servers.

It is neither the purpose nor the ability of any of the above enterprises (FinRead and the PC/SC Workgroup, EMV, and card payment services) to provide security for existing Internet applications, such as web browsing, email, or FTP. So attacks on these existing Internet applications by malware and inauthentic servers remain possible when these enterprises are used. Furthermore, none of the above enterprises defend against counterfeit secure terminals.

U.S. Pat. No. 5,815,577 to Innovonics (1998) uses a secure terminal connected to a PC motherboard as a local peripheral, but it is limited to simple encryption of user input for the sole purpose of privacy. It does not provide any other basic cryptographic operations such as authentication, integrity, and decryption. Its secure terminal does not support SSL nor Internet client software which employs SSL (such as web browsing, email or FTP) so its secure terminal cannot be used with existing Internet servers and it does not defend Internet users against attacks by malware and inauthentic servers. Furthermore, it does not defend against counterfeit secure terminals.

U.S. Pat. No. 6,834,271 to Kryptosima (2004) uses a secure terminal connected to a PC motherboard as a local peripheral, but it is limited to the secure encryption of a PIN block for a financial transaction. It suffers the weaknesses of U.S. Pat. No. 5,815,577 and of card payment services, both discussed earlier in this sub-section:

- Its secure terminal does not support SSL nor Internet client software which employs SSL (such as web browsing, email or FTP) so its secure terminal cannot be used with existing Internet servers and it does not defend Internet users against attacks by malware and inauthentic servers;
- It does not defend against counterfeit secure terminals;
- Its scope is limited to payment transactions;
- It requires a web merchant to invest in changes to the merchant's server's infrastructure by connecting to a "secure transaction management system";
- All other cryptography is performed on the PC motherboard so it is vulnerable to malware; and
- It performs some sensitive aspects of financial transactions on the user's regular PC, not on the secure terminal, such as displaying a "merchant response software log number", so those aspects remain vulnerable to malware or to inauthentic servers.

(l) Pre-Loading Certificates Onto a Secure Terminal

In order to defend against inauthentic servers, some existing secure terminals may pre-load servers' certificates (or the certificates' digital signatures).

For example, this pre-loading may be employed by a secure terminal when public key cryptography is used to transport a symmetric key from a financial institution to a secure terminal. Or to take another example, this pre-loading may be performed within the FinRead environment (mentioned above).

But this pre-loading of certificates (or digital signatures) does not mitigate the threat of inauthentic Internet servers. Internet servers, such as web pages or FTP hosts, use the SSL protocol, but these pre-loaded certificates (or digital signatures) are used for purposes other than SSL.

Furthermore, these secure terminals do not execute Internet client software (such as SSL, HTTP, and a web browser) so PC Internet users remain exposed to malware.

(m) Secure Terminals and SSL

There are a few secure terminals, such as the Hypercom ICE 7000CE, which use the Microsoft Windows CE operating system. Windows CE supports the use of SSL.

Compared to regular secure terminals, these secure terminals have extremely powerful hardware, with significantly larger memory, faster speed, and other features. So these secure terminals are not considered for use as PC local peripherals because they are over-engineered for the purpose and their retail cost is too high.

Furthermore, the TCP/IP protocol is not used to connect a local peripheral to a PC motherboard. Windows CE generally uses TCP/IP when supporting SSL, so when SSL is used as such, these secure terminals are autonomous stand-alone devices which are not PC local peripherals.

These secure terminals would not be PC local peripherals so these secure terminals would not be used by PC Internet users to defend against malware or inauthentic servers.

Furthermore, these secure terminals do not defend against counterfeit secure terminals.

(n) Summary of Possible Attacks

Three classes of possible attacks have been discussed.

Firstly, malware residing on a PC may eavesdrop on or modify data, even when SSL is used.

Secondly, a server may not be authentic, even when SSL is used. Man-in-the-middle attacks and counterfeit servers may be successful.

Thirdly, a legitimate secure terminal may be surreptitiously replaced by a counterfeit secure terminal.

3. Objects And Advantages

Accordingly, several objects and advantages of the present invention are:

- to defend a PC Internet user against malware attacks, such as viruses, spyware, trojan horses, and worms;
- to defend a PC Internet user against inauthentic Internet servers, such as man-in-the-middle and counterfeit servers; and
- to defend a secure terminal user against the surreptitious replacement of a legitimate secure terminal with a counterfeit secure terminal.

Further objects and advantages of the invention will become apparent from a consideration of the ensuing description.

BRIEF SUMMARY OF THE INVENTION

The purpose of the invention is to provide an environment in which a PC user may safely exchange data with a remote server over the Internet.

A secure terminal is used as a PC local peripheral.

SSL, and Internet software which employs SSL, are executed on the secure terminal. This defends Internet users against malware.

SSL certificates or their digital signatures may be pre-loaded into the secure terminal. This defends Internet users against inauthentic Internet servers (such as man-in-the-middle and counterfeit servers).

The user and the secure terminal may be mutually authenticated using passwords. This defends secure terminal users against counterfeit secure terminals.

The software on the secure terminal is Internet software which employs SSL, rather than some other software which uses some other cryptographic scheme, so that it is compatible with existing systems on the Internet.

By providing this protection on a device which is a PC local peripheral, a user may perform regular tasks on conventional PC equipment (which has superior hardware) and may conveniently and seamlessly switch to a secure terminal to perform sensitive tasks.

For example, web browser software is executed on conventional PC equipment (motherboard, keyboard, mouse, monitor, etc.) to surf the Internet and to select goods to purchase. But to pay for the goods, web payment software (employing SSL) is executed on the secure terminal. Rather than entering or viewing sensitive information (such as passwords or credit card numbers) on conventional PC equipment and exposing this information to attack, sensitive information is protected by the secure terminal.

BRIEF DESCRIPTION OF THE DRAWINGS

1. Prior Art

FIG. 1 (SSL Defense) shows SSL defending against attacks over the Internet.

FIG. 2 (SSL No Defense) shows that SSL does not defend against malware attacks within a PC.

FIG. 3 (Man-In-The-Middle) shows that SSL does not defend against man-in-the-middle attacks.

FIG. 4 (Secure Terminal As PC Local Peripheral) shows a secure terminal connected to a PC motherboard as a local peripheral.

2. Description

A more complete appreciation of the present invention and many of the attendant advantages thereof will be readily understood by reference to the following detailed description when taken in conjunction with the accompanying drawings, in which:

FIG. 5 (Local Peripherals) shows a PC's local peripherals.

FIG. 6 (Overview) shows the highest level view of the system.

FIG. 7 (Secure Terminal And Motherboard Software) shows software which executes on the secure terminal and on the PC motherboard.

FIG. 8 (Internet Protocol And Internet Application Software) shows Internet protocol software and Internet application software which execute on the secure terminal.

FIG. 9 (Web Client Software) shows software that uses the world wide web and which executes on the secure terminal.

FIG. 10 (SSL Client Software) shows SSL client software which executes on the secure terminal.

FIG. 11 (Offline Application Software) shows offline application software which executes on the secure terminal.

DETAILED DESCRIPTION OF THE INVENTION

1. Introduction (a) Defense Against Malware

The current invention provides a defense against malware by executing SSL (and Internet software which employs SSL) on a secure terminal which is a local peripheral to a PC.

When SSL (and Internet software which employs SSL) executes on a PC motherboard to exchange data with a remote Internet server, malware residing on the PC may read (eavesdrop) or write (corrupt) the sensitive information which is being exchanged. SSL adequately defends a PC user against attacks that take place out on the Internet, but SSL does not defend against malware which resides on a PC.

A secure terminal is expressly designed to be resistant to malware.

For example, when a user types their web banking password on a PC keyboard, spyware could steal the password. Even if SSL is used between the user's web browser and the bank's web server, it is straightforward to mount a hardware keystroke logger on a PC keyboard cable. However, a secure terminal's keyboard may be physically shielded to prevent the mechanical insertion of spyware probes, providing a protected keyboard on which the user may safely type their password.

Taking another example, when a user sends and receives emails, a virus could modify the emails' text. Even if SSL is used between the user's email client and the email server, a virus could change the email's text which is displayed on the monitor or stored in memory. While any software (including viruses) may easily be installed on a PC motherboard, a secure terminal may use cryptographic techniques to authenticate any new software before the software is installed, preventing the installation of unauthorized software such as viruses, and providing a protected environment with which the user may safely send and receive emails.

So to defend against malware, SSL (and Internet software which employs SSL) are executed on a secure terminal. Malware is prevented from reading from (eavesdropping) and writing to (corrupting) all information used by SSL (and by Internet software which employs SSL). This information is safely held in the secure terminal's internal memory, and this information may be safely input or output via the secure terminal's interfaces (examples of interfaces are a keyboard, display screen, audio speaker, USB cable, and smart card contacts).

The secure terminal is a local peripheral to a PC, and when information travels through the PC motherboard and through the Internet, SSL is an adequate defense. An end-to-end secure channel is established between the client and the server, with the current invention providing the client's end.

(b) Defense Against Inauthentic Internet Servers

The current invention provides a defense against inauthentic Internet servers by pre-loading Internet servers' SSL certificates into a secure terminal.

When an Internet user attempts to exchange data with a remote Internet server, an attacker may surreptitiously redirect the user's client software to the attacker's server instead of the legitimate server. Man-in-the-middle and counterfeit server attacks may then be perpetrated.

If SSL (and Internet software which employs SSL) are executed on a secure terminal, as is the case with the present invention, then this threat may be defended against.

To defend against this attack, an Internet server's SSL certificate may be pre-loaded into a secure terminal. For a given server, the user's SSL client software within the secure terminal will only use that server's pre-loaded SSL certificate. If the user's SSL client software is redirected to the attacker's server, the user's SSL client software will be able to detect this redirection because the attacker's server's SSL certificate will not match the pre-loaded SSL certificate.

For example, a bank posts a smart card containing an Internet banking web site's SSL certificate to a user. The user inserts the smart card into a secure terminal and the SSL certificate is loaded from the smart card into the secure terminal. When the user visits the Internet banking web site, the secure terminal will only accept the pre-loaded certificate. A phishing email directing the user to a counterfeit web site will be unsuccessful since the counterfeit site uses a different certificate. Or an attacker's man-in-the-middle server will be unsuccessful because the attacker's server uses a different certificate.

A variation on this technique is to just pre-load a certificate's digital signature, rather than pre-loading an entire certificate. A secure terminal will only accept a server's certificate if its digital signature matches.

This defense would not be effective if SSL (and Internet software which employs SSL) are executed on a PC motherboard, since an attacker's malware would be able to modify the pre-loaded certificate to be the attacker's certificate. This defense is only effective if malware is defended against, and malware is defended against by executing SSL (and Internet software which employs SSL) on a secure terminal.

(c) Defense Against Counterfeit Secure Terminals

The current invention provides a defense against counterfeit secure terminals by using mutual password authentication.

An attacker may attempt to surreptitiously swap a user's secure terminal with the attacker's counterfeit secure terminal. The counterfeit secure terminal appears to be identical to the legitimate secure terminal, but in fact it delivers the user's private information to the attacker.

To defend against this attack, the user presents their "user password" to the secure terminal (such as keyboard entering it), and the secure terminal then presents its "secure terminal password" to the user (such as showing it on the secure terminal's display screen).

If the correct secure terminal password is shown then the user may be confident that the secure terminal has not been tampered with, because:

The secure terminal password is kept secret and is only known to the user;

The correct user password must be presented to the secure terminal before the secure terminal will show the secure terminal password, so the secure terminal password will only be shown to an authentic user; and A secure terminal is designed to prevent the extraction of any data stored within it, so an attacker would not be able to extract the secure terminal password from the legitimate secure terminal.

2. Preferred Embodiment (a) Local Peripherals

PC local peripherals, including a secure terminal 1, are connected to a PC motherboard 2 using short connections.

FIG. 5 (Local Peripherals) shows an example of this, where the local peripherals are a monitor, keyboard, mouse, and secure terminal 1.

(b) Internet

Referring to FIG. 6 (Overview), the secure terminal 1, as a local peripheral, is connected to the PC motherboard 2 using a short connection. The PC motherboard 2 is connected to the Internet 3. A server 4 is connected to the Internet 3.

The secure terminal 1 is not directly connected to the Internet 3. The secure terminal 1 can only access the Internet 3 by passing data through the PC motherboard 2.

There are many methods by which the PC motherboard 2 may be connected to the Internet 3, some of which require the use of a local peripheral such as a modem. These methods include dial-up, cable or DSL, or via a network using Ethernet, Wi-Fi, CDMA 1xRTT or GPRS.

(c) Motherboard Software

FIG. 7 (Secure Terminal And Motherboard Software) shows the relevant software which executes on the PC motherboard 2.

TCP/IP socket software 12 executes on the PC motherboard 2. This software handles TCP/IP communications over the Internet 3, and is most commonly provided by the operating system which executes on the PC motherboard 2.

Device driver software 11 executes on the PC motherboard 2. This software implements a communications protocol to provide the interface between the PC motherboard 2 and the secure terminal 1.

PC application software 13 may execute on the PC motherboard 2, its presence is optional. This software uses the secure terminal 1 via the device driver software 11 and it may optionally communicate over the Internet 3 using the TCP/IP socket software 12. There are different methods by which the PC application software 13 and the device driver software 11 interface.

(d) Secure Terminal Software

FIG. 7 (Secure Terminal And Motherboard Software) also shows the relevant software which executes on the secure terminal 1.

PC interface software 9 executes on the secure terminal 1. This software implements a given communications protocol to provide the interface between the secure terminal 1 and the PC motherboard 2.

SSL client software 8 executes on the secure terminal 1. This software implements the client side of the SSL scheme. The SSL client software 8 sends data to and receives data from the PC interface software 9.

Protocol software 7 executes on the secure terminal 1. A protocol is defined as a formalized set of rules which specify the format and control of data. The protocol software 7 sends data to and receives data from the SSL client software 8.

Application software 6 executes on the secure terminal 1. An application is defined as software designed to meet a user's ultimate goals, as opposed to system software. The application software 6 exchanges commands with the PC interface software 9, and the application software 6 uses the protocol software 7 with certain applications using certain protocols.

The secure user interface 5 comprises software which executes on the secure terminal 1 and hardware which is a component of the secure terminal 1. The secure user interface 5 inputs data from the user to the secure terminal 1 and outputs data from the secure terminal 1 to the user. The secure user interface 5 includes secure terminal 1 devices such as the display screen, keyboard, audio speaker, magnetic card reader, and smart card reader/writer. The application software 6 uses the secure user interface 5.

Pre-loaded certificates 10 reside on the secure terminal. The application software 6 manages the certificates and digital signatures within this storage area. The SSL client software reads certificates and digital signatures from this storage area.

(e) Protocol and Application Software

FIG. 8 (Internet Protocol And Internet Application Software) shows examples of Internet protocol software 7 and Internet application software 6 which execute on the secure terminal 1.

HTTP client software 19 is protocol software 7 which implements the client side of the Hypertext Transport Protocol (as specified in RFC2616, RFC2817 and RFC2818). Web client software 14 is application software 6 which executes on the secure terminal 1 and uses the HTTP client software 19 to access the world wide web.

POP3, SMTP & IMAP4 client software 20 is protocol software 7 which implements the client side of the Post Office Protocol (as specified in RFC1939 and RFC2595), the Simple Mail Transfer Protocol (as specified in RFC2821 and RFC2487) and the Internet Message Access Protocol (as specified in RFC3501 and RFC2595). Email client software 15 is application software 6 which executes on the secure terminal 1 and uses the POP3, SMTP & IMAP4 client software 20 to compose and send, to receive and read, and to manage email.

LDAP client software 21 is protocol software 7 which implements the client side of the Lightweight Directory Access Protocol (as specified in RFC3377, RFC2829 and RFC2830). Directory client software 16 is application software 6 which executes on the secure terminal 1 and uses the LDAP client software 21 to access a directory.

FTP client software 22 is protocol software 7 which implements the client side of the File Transfer Protocol (as specified in RFC959, RFC2228 and RFC4217). File transfer client software 17 is application software 6 which executes on the secure terminal 1 and uses the FTP client software 22 to transfer and manage files.

Telnet client software 23 is protocol software 7 which implements the client side of the Telnet protocol (as specified in RFC854 and INTERNET-DRAFT draft-ietf-tn3270e-telnet-tls-06). Terminal emulation client software 18 is application software 6 which executes on the secure terminal 1 and uses the Telnet client software 23 to remotely control a server.

The web client software 14, email client software 15, directory client software 16, file transfer client software 17, and terminal emulation client software 18 use the secure user interface 5.

Other applications and protocols which employ SSL may also be used.

(f) Web Client Software

The web client software 14 executes on the secure terminal 1. See FIG. 9 (Web Client Software).

HTML parser software 25 interprets Hypertext Markup Language data (as specified by W3C, the World Wide Web Consortium) from the world wide web.

Web browser software 24 is an application which surfs the web. This software uses the HTTP client software 19, the HTML parser software 25, and the secure user interface 5.

Web payment software 26 is an application which supports payment schemes on the web. This software uses the HTTP client software 19, the HTML parser software 25, and the secure user interface 5.

Other web applications may also be used.

(g) SSL Client Software

The SSL client software 8 executes on the secure terminal 1. FIG. 10 (SSL Client Software) shows components of the SSL client software 8.

The protocols implemented by the SSL client software 8 are defined in the specification for Transport Layer Security, RFC2246.

The SSL record software 31 handles the SSL record layer. This software formats data into and out of SSL records when it sends and receives with the PC interface software 9, the SSL handshake software 28 and the SSL data transfer software 30.

The SSL handshake software 28 performs the SSL handshake. This software is instructed by the SSL management software 27, it sends and receives data with the SSL record software 31, it reads the pre-loaded certificates 10, and it uses the SSL cryptographic software 29.

The SSL data transfer software 30 handles the sending and receiving of payload data using SSL. This software is instructed by the SSL management software 27, it sends and receives data with the SSL record software 31, and it uses the SSL cryptographic software 29.

The SSL cryptographic software 29 performs SSL cryptographic operations. This software performs these services for the SSL handshake software 28 and the SSL data transfer software 30.

The SSL management software 27 provides highest level control of the SSL client software 8 and interfaces with the protocol software 7.

(h) Offline Application Software

Offline applications executing on the secure terminal 1 are shown in FIG. 11 (Offline Application Software).

Mutual authentication software 32 is an application which enters and displays passwords. This software uses the secure user interface 5.

Certificate load software 33 is an application which imports servers' 4 certificates and servers' 4 certificates' digital signatures and stores them as pre-loaded certificates 10. This software uses the secure user interface 5, and in some cases may also communicate online.

Other offline applications may also be used.

3. Operation of the Invention (a) Data Between Secure Terminal and Server

Referring to FIG. 7 (Secure Terminal And Motherboard Software), when the secure terminal 1 exchanges data with the server 4, the data is protected by SSL as it travels through the PC motherboard 2 and through the Internet 3.

The start and end point of the data within the secure terminal 1 is the application software 6. When the application software 6 sends data to the server 4, the data makes its way through the protocol software 7, the SSL client software 8, the PC interface software 9, the device driver software 11, the TCP/IP socket software 12, and the Internet 3. When the server 4 sends data to the application software 6, the data follows the same path in reverse.

(b) Defense Against Malware

Still referring to FIG. 7 (Secure Terminal And Motherboard Software), the software which executes on the secure terminal 1 includes the application software 6, protocol software 7 and SSL client software 8.

By executing this software on the secure terminal 1, and by using the secure user interface 5, attacks by malware are prevented because the secure terminal is expressly designed to resist malware.

When the current invention is not used, the equivalent of this software (applications, protocols, and SSL client) is executed on the PC motherboard 2, and the regular PC user interface (such as a monitor, keyboard and mouse) is used. Such a system is vulnerable to malware attacks.

(c) Application Initiates Internet Activity

Still referring to FIG. 7 (Secure Terminal And Motherboard Software), the application software 6 initiates Internet 3 activity which involves communications with the server 4.

The Internet 3 activity may be triggered by some autonomous determination of the application software 6 itself, such as a requirement to act at a specific time of day. Or it may be triggered by the secure user interface 5, such as the user entering a command on the secure terminal's 1 keyboard. Or it may be triggered by a command which the application software 6 receives from the PC application software 13 via the device driver software 11 and the PC interface software 9.

(d) Application and Protocol Software

Still referring to FIG. 7 (Secure Terminal And Motherboard Software), to initiate Internet 3 activity, the application software 6 issues an instruction to the relevant protocol software 7. The protocol software 7 eventually returns a result back to the application software 6.

The application software 6 processes this result, and the application software 6 may then issue a further instruction to the protocol software 7, and so on.

For example, referring to FIG. 8 (Internet Protocol And Internet Application Software), the web client software 14 may issue an instruction to the HTTP client software 19 to retrieve a particular HTML web page from the server 4. The HTTP client software 19 then returns the HTML web page to the web client software 14.

(e) Protocol Software

Referring to FIG. 7 (Secure Terminal And Motherboard Software), when the protocol software 7 receives an instruction from the application software 6, the protocol software 7 performs this instruction by stepping through the protocol's rules.

When the protocol dictates that data is to be sent to or received from the server 4, the protocol software 7 sends data to or receives data from the SSL client software 8.

Once the protocol determines that the instruction's result has been obtained, the protocol software 7 passes the result back to the application software 6.

For example, referring to FIG. 8 (Internet Protocol And Internet Application Software), the HTTP client software 19 may receive an instruction from the web client software 14 to retrieve a particular HTML web page from the server 4. The HTTP client software 19 then:

constructs an HTTP "GET method request" and sends this to the server 4 via the SSL client software 8;
receives data from the server 4 via the SSL client software 8 until the entire HTTP "header" has been received;
scans the HTTP header to determine how to obtain the length of the HTTP "body";
receives data from the server 4 via the SSL client software 8 until the entire HTTP body has been received; and
extracts the HTML web page from the HTTP body and returns this result to the web client software 14.

(f) SSL Management Software

The SSL client software 8 shown in FIG. 7 (Secure Terminal And Motherboard Software) is expanded in FIG. 10 (SSL Client Software).

When the protocol software 7 instructs the SSL client software 8 to send data to or receive data from the server 4, the SSL management software 27 instructs the SSL handshake software 28 to ensure that an SSL handshake has been performed with the server 4.

The SSL management software 27 then instructs the SSL data transfer software 30 to send the data to or receive the data from the server 4.

The SSL management software 27 then delivers the result to the protocol software 7.

(g) SSL Handshake Software

Referring to FIG. 10 (SSL Client Software), when the SSL management software 27 instructs the SSL handshake software 28 to ensure that an SSL handshake has been performed with the server 4, the SSL handshake software 28 first determines the state of the SSL handshake with that server 4.

If a full handshake is required, the SSL handshake software 28 exchanges a series of handshake messages with the server 4.

If a full handshake has already been performed but the session must be resumed or restarted, the SSL handshake software 28 exchanges a reduced series of handshake messages with the server 4.

If a full handshake has already been performed and the session need not be resumed nor restarted, the SSL handshake software 28 does not exchange any handshake messages with the server 4.

When exchanging handshake messages with the server 4, the SSL handshake software 28 sends data to and receives data from the SSL record software 31, and the SSL handshake software 28 uses cryptographic services from the SSL cryptographic software 29.

(h) Verify Received Certificate

A server's 4 certificate, or the certificate's digital signature, may be pre-loaded and stored as pre-loaded certificates 10.

Still referring to FIG. 10 (SSL Client Software), when a server's 4 certificate is received during a full SSL handshake, the SSL handshake software 28 may look through the pre-loaded certificates 10 for an entry for this particular server 4 and only accept the received certificate if it, or its digital signature, is identical to the stored value.

This defends against inauthentic Internet 3 servers 4, such as man-in-the-middle and counterfeit servers 4.

(i) SSL Data Transfer Software

Still referring to FIG. 10 (SSL Client Software), when the SSL management software 27 instructs the SSL data transfer software 30 to send data to or receive the data from the server 4, the SSL data transfer software 30 sends data to and receives data from the SSL record software 31, and the SSL data transfer software 30 uses cryptographic services from the SSL cryptographic software 29.

(j) SSL Cryptographic Software

Still referring to FIG. 10 (SSL Client Software), the SSL cryptographic software 29 performs cryptographic operations as requested by the SSL handshake software 28 and the SSL data transfer software 30.

These cryptographic operations meet specific SSL requirements. For example, the SSL cryptographic software 29 performs an operation in which an authentication code is appended to data and the result is then enciphered. This corresponds to the SSL requirement for processing payload data before it is sent by the client to the server 4.

Or as another example, there is a cryptographic operation to add data to two hash codes, and there is another cryptographic operation to calculate the value of these two hash codes. This corresponds to the SSL requirement to calculate hash codes for all data sent and received during the SSL handshake.

The precise cryptographic operations which are performed are defined by the cipher suite. The cipher suite is chosen during the SSL handshake by a negotiation between the SSL handshake software 28 and the server 4. An example of a cipher suite may be "RSA with RC4-128 and MD5".

The SSL cryptographic software 29 also performs the generic lower level cryptographic functions that are employed by the higher level cryptographic operations. Examples of these generic lower level cryptographic functions include encipherment, decipherment, calculating authentication codes, and calculating hash codes.

(k) SSL Record Software

Still referring to FIG. 10 (SSL Client Software), the SSL handshake software 28 and the SSL data transfer software 30 send data to and receive data from the server 4 via the SSL record software 31.

When sending data to the server 4, the SSL record software 31 receives the data from either the SSL handshake software 28 or the SSL data transfer software 30. The SSL record software 31 inserts an SSL record header before the data, and then sends the data to the PC interface software 9. This inserted SSL record header describes the data, such as its type and length.

When receiving data from the server 4, the SSL record software 31 receives the data from the PC interface software 9. The SSL record software 31 searches the received data for SSL record headers, divides the received data into its constituent SSL records (along with their header information such as type and length), and passes the data within the records either to the SSL handshake software 28 or to the SSL data transfer software 30.

(l) PC Interface Software Sends and Receives

Still referring to FIG. 10 (SSL Client Software), the SSL record software 31 sends data to and receives data from the server 4 via the PC interface software 9.

Referring now to FIG. 7 (Secure Terminal And Motherboard Software), the PC interface software 9 sends data to and receives data from the server 4 via the device driver software 11.

When sending data to the server 4, the PC interface software 9 receives data from the SSL record software 31 and then sends it to the device driver software 11. When receiving data from the server 4, the PC interface software 9 receives data from the device driver software 11 and then sends it to the SSL record software 31.

The PC interface software 9 executes on the secure terminal 1 and the device driver software 11 executes on the PC motherboard 2. So data is sent and received between the PC interface software 9 and the device driver software 11 by way of the short connection between the PC motherboard 2 and the secure terminal 1.

The short connection employs its own specific interface technology, for example USB. On top of this, the PC interface software 9 and the device driver software 11 subscribe to a given communications protocol. This communications protocol includes a data link layer which ensures that the communications are error free, and an application layer which defines various messages.

To take an example of the data link layer of this communications protocol, when sending an application payload this layer may precede the application payload with a start character and a sequence number, and follow the application payload with a checksum and an end character. Upon receiving an application payload, it may send positive or negative acknowledgement characters to indicate whether or not a received checksum is correct.

To take an example of the application layer of this communications protocol, the device driver software 11 and the PC interface software 9 may send messages alternately, where each message comprises a message type optionally followed by a field. Below is a sample trace of such an application layer protocol. This example involves browsing a web page. Note that the URI (uniform resource identifier) is the server's 4 name and address on the Internet 3. In this sample trace, messages from the device driver software 11 are given as "-->" and messages from the PC interface software 9 are given as "<--".

--> Browse Launch
<-- Set URI, URI
--> URI Set
<-- Send, Data To Send
--> Sent
<-- Receive, Maximum Length
--> Received, Data Received
<-- Send, Data To Send
--> Sent
<-- Receive, Maximum Length
--> Received, Data Received
<-- Receive, Maximum Length
--> Received, Data Received
<-- Browse Done The communications protocol between the PC interface software 9 and the device driver software 11 is not TCP/IP and does not use TCP/IP, since TCP/IP is not used by local peripherals.

(m) Device Driver Software Sends and Receives

Still referring to FIG. 7 (Secure Terminal And Motherboard Software), the PC interface software 9 sends data to and receives data from the server 4 via the device driver software 11. The device driver software 11 sends data to and receives data from the server 4 via the TCP/IP socket software 12.

When sending data to the server 4, the device driver software 11 receives data from the PC interface software 9 and then sends it to the TCP/IP socket software 12. When receiving data from the server 4, the device driver software 11 receives data from the TCP/IP socket software 12 and then sends it to the PC interface software 9.

(n) TCP/IP Socket Software, Internet and Server

Still referring to FIG. 7 (Secure Terminal And Motherboard Software), the device driver software 11 sends data to and receives data from the server 4 via the TCP/IP socket software 12. The TCP/IP socket software 12 sends data to and receives data from the server 4 via the Internet 3.

When sending data to the server 4, the TCP/IP socket software 12 receives data from the device driver software 11 and then sends it to the Internet 3. When receiving data from the server 4, the TCP/IP socket software 12 receives data from the Internet 3 and then sends it to the device driver software 11.

The server 4 processes the data as the server 4 deems appropriate and in accordance with the Internet protocol being used.

(o) Application Concludes Internet Activity

Still referring to FIG. 7 (Secure Terminal And Motherboard Software), the application software 6 terminates the Internet 3 activity.

This conclusion of the Internet 3 activity may be triggered by some autonomous determination of the application software 6 itself, such as a task being completed. Or it may be triggered by the secure user interface 5, such as the user hitting cancel on the secure terminal's 1 keyboard. Or it may be triggered by a command which the application software 6 receives from the PC motherboard 2 via the PC interface software 9.

(p) Application Manages User Interface

Still referring to FIG. 7 (Secure Terminal And Motherboard Software), at all stages throughout the Internet 3 activity, the application software 6 may interact with the user via the secure user interface 5.

For example, the application may present text or graphics on the secure terminal's 1 display screen, or it may input keystrokes via the secure terminal's 1 keyboard, or it may play sounds on the secure terminal's 1 audio speaker, or it may read a magnetic stripe card, or it may communicate with a smart card.

This interaction with the user is determined by the application software 6.

(q) Other Messages Between PC Motherboard and Secure Terminal

Still referring to FIG. 7 (Secure Terminal And Motherboard Software) and as described above, the device driver software 11 and the PC interface software 9 communicate using a given protocol which includes an application layer.

The above example shows a trace of an application layer in which the secure terminal 1 sends data to and receives data from the server 4 while browsing a web page.

In the above example, the message types from the PC interface software 9 which directly relate to sending to and receiving from the server 4 are:
Set URI
Send
Receive In the above example, the message types from the device driver software 11 which directly relate to sending to and receiving from the server 4 are:
URI Set
Sent
Received Other message types may be used for purposes other than sending to and receiving from a server 4.

For example, other message types from the device driver software 11 may:
Provide the device driver software's 11 version number.
Instruct the secure terminal 1 to launch a particular application, such as the web payment software 26 or the certificate load software 33.
Instruct the secure terminal 1 to abort an application which is currently underway.

For example, other message types from the PC interface software 9 may:
Provide the secure terminal's 1 software or hardware version numbers.
Advise that an application has completed, successfully or not.

These other messages types involve direct communication between the PC interface software 9 and the application software 6.

(r) PC Application Software and Device Driver Software

Still referring to FIG. 7 (Secure Terminal And Motherboard Software), the PC application software 13 may communicate over the Internet 3 via the TCP/IP socket software 12. These communications are totally independent of any communications over the Internet 3 performed by the secure terminal 1.

The PC application software 13 may also request a service from the secure terminal 1 via the device driver software 11. Once a result has been obtained for that service, the device driver software 11 returns the result to the PC application software 13.

There are different methods by which the PC application software 13 and the device driver software 11 may interface. For example, the device driver software 11 may be an ActiveX COM automation server, the PC application software 13 may be an ActiveX COM automation controller/client, and the device driver software's 11 specification would include its program ID (comprising its server name and type name) and details of its methods and its properties.

The PC application software 13 may take any form and provide any functionality. For example, the PC application software 13 may be a web browser with which a user visits a retail web site, selects goods to purchase, and then proceeds to the web site's checkout. The web site can then instruct the web browser to use the secure terminal 1 to handle the payment. The web browser communicates with the device driver software 11 which in turn sends a message to the PC interface software 9 which then launches the web payment software 26.

(s) Offline Applications

Aside from communicating over the Internet 3, the application software 6 executing on the secure terminal 1 may also perform offline operations.

These offline operations may be triggered by similar events to those that may trigger Internet 3 operations. They may be triggered by some autonomous determination of the application software 6 itself, or they may be triggered by the secure user interface 5, or they may be triggered by a command which the application software 6 receives from the PC application software 13 via the device driver software 11 and the PC interface software 9.

(t) Certificate Load

FIG. 11 (Offline Application Software) shows the certificate load software 33. This software is an offline application that imports servers' 4 certificates and servers' 4 certificates' digital signatures and stores them as pre-loaded certificates 10 for use by the SSL handshake software 28.

The certificate load software 33 can import the certificates and digital signatures from various sources such as:
From a smart card via the secure user interface 5.
From the PC application software 13 via the device driver software 11 and the PC interface software 9.
From a remote "certificate authority" using a regular "public key infrastructure" scheme. (This is actually an online operation over the Internet 3).

(u) Mutual Authentication

FIG. 11 (Offline Application Software) also shows the mutual authentication software 32 which is an offline application that allows the user to be confident that the secure terminal 1 is authentic and has not been tampered with.

The first time a secure terminal 1 is ever used, and periodically thereafter, the user chooses a "user password" and a "secure terminal password" and loads these passwords into the secure terminal 1 via the secure user interface 5.

Depending on the secure terminal's 1 configuration, mutual authentication may be performed upon various events, such as when the secure terminal 1 powers up, or before a particular application is used.

Mutual authentication comprises the following steps. The user keyboard enters the user password into the secure terminal 1. If the user password is correct, the secure terminal 1 then shows the secure terminal password on the secure terminal's 1 display screen. If the secure terminal password is correct, the user may be confident that the secure terminal 1 is authentic and has not been tampered with.

4. Conclusion, Ramifications, and Scope (a) Conclusion

This invention provides PC users with an extremely strong defense against three classes of attack:
Malware is defended against by executing SSL, and by executing Internet software which employs SSL, on a secure terminal which is a PC local peripheral.
Inauthentic Internet servers (such as man-in-the-middle and counterfeit servers) are defended against by pre-loading server's SSL certificates or their digital signatures into a secure terminal.
Counterfeit secure terminals are defended against by performing mutual password authentication between a user and a secure terminal.

This invention is compatible with existing Internet infrastructure, so it is a realistic solution to one of the greatest problems that users currently face on the Internet.

(b) Ramifications

While the above description contains many specificities, these should not be construed as limitations on the scope of the invention, but rather as an exemplification of one preferred embodiment thereof. Many other variations are possible. For example:

- Updated versions of the given Internet protocols may be supported by the secure terminal. For example, the HTTP protocol is given above as version 1.1 defined in RFC2616, but HTTP version 1.2 is currently under development and may be supported.
- Updated versions of SSL (TLS) may be supported by the secure terminal. For example, the version of the SSL protocol given above is TLS version 1.0 defined in RFC2246, but TLS version 1.1 is currently under development (see INTERNET-DRAFT draft-ietf-tls-rfc2246-bis-13) and may be supported.
- Other Internet protocols or Internet applications which employ SSL may also be used by the secure terminal. An example is the NNTP protocol (Network News Transport Protocol as specified in RFC977 and INTERNET-DRAFT draft-ietf-nntpext-tls-nntp-09) with a corresponding news application. A further example is the IIOP protocol (Internet Inter-ORB Protocol) or the RMI protocol (Remote Method Invocation) with a distributed object application. A further example is an XML (Extensible Markup Language as specified by the World Wide Web Consortium) application, which may use the HTTP protocol.
- Other web applications which employ SSL may also be used by the secure terminal. For example, a web application designed for casting a vote in an election may be supported.
- Other offline applications may be supported by the secure terminal. For example, an offline application can manage (import, export, view, edit) sensitive files which are safely stored in the secure terminal's memory rather than on a PC's hard disk. Or an offline application can set the secure terminal's clock.
- Aside from the software described herein, any other software may also execute on the secure terminal, so long as this other software does not compromise the security nor functionality of the software described herein.
- Aside from the software described herein, any other software whatsoever may also execute on the PC motherboard and on the server.
- The communications protocol used to interface between the PC motherboard and the secure terminal may be different to the example given herein.
- The interface between the PC application software and the device driver software may be different to the example given herein (which involved ActiveX COM). For example, the PC application software may be a Mozilla browser and the device driver software may be a Netscape plug-in.
- The PC application software may take a different form and provide different functionality to the example given herein (in which the PC application software is a web browser which kicks-off the secure terminal's web payment software). For example, the PC application software may be an email program which invokes the secure terminal whenever sensitive emails are to be sent or received.
- Other short connection technologies between the PC motherboard and the secure terminal may be used. This excludes technologies such as TCP/IP or Ethernet which are used to connect stand-alone pieces of equipment.
- The physical form of the secure terminal may be different. For example, the secure terminal may be embedded within a PC keyboard or a notebook PC, or the secure terminal may or may not possess certain hardware devices such as a magnetic card reader, a smart card reader/writer, and an audio speaker.
- During mutual authentication, the user password may use a format or medium other than keyboard entry. For example, it may be biometric identification such as a fingerprint, retinal scan, or voice recognition.
- During mutual authentication, the secure terminal password may use a format or medium other than displayed text. For example, the secure terminal's password may be a displayed graphical image or an audio sequence.

(c) Scope

Accordingly, the scope of the invention should be determined not by the embodiments illustrated, but by the appended claims and their legal equivalents.

5. Acknowledgements

ActiveX, Microsoft, Windows, and Windows CE are registered trademarks of Microsoft Corporation.

Bluetooth is a registered trademark of Bluetooth SIG Inc.

Centronics is a registered trademark of Centronics Data Computer Corporation.

EMV is a registered trademark of EMVCO LLC.

FireWire is a registered trademark of Apple Computer Inc.

Hypercom is a registered trademark of Hypercom Corporation.

MasterCard is a registered trademark of MasterCard International Incorporated.

Mozilla is a registered trademark of the Mozilla Foundation.

Netscape is a registered trademark of Netscape Communications Corporation.

PS/2, VGA, and XGA are registered trademarks of International Business Machines Corporation.

RC4 is a registered trademark of RSA Security Inc.

SCSI is a registered trademark of Security Control Systems Inc.

SVGA is a registered trademark of Video Electronic Standards Association.

Visa is a registered trademark of Visa International Service Association.

All RFCs (requests for comments, for example RFC2246) and INTERNET-DRAFTs (for example INTERNET-DRAFT draft-ietf-tls-rfc2246-bis-13) are defined by the IETF (Internet Engineering Task Force).

I claim:

1. A method of securely sending private input data over the Internet using a secure terminal connected by a short connection to a personal computer, said method comprising the steps of:

(a) providing said personal computer which is connected to the Internet;

(b) providing said secure terminal which includes a user interface and memory, and which resists tampering, detects attempts to be tampered with, responds to said attempts by erasing data from said memory, and executes only authorized software;

(c) connecting said secure terminal by said short connection to said personal computer, wherein said secure terminal is a local peripheral of said personal computer;

(d) executing both TCP/IP (Transmission Control Protocol/Internet Protocol) socket software and secure terminal device driver software on said personal computer;

(e) executing both PC (Personal Computer) interface software and Internet client software on said secure terminal;

(f) directly entering said private input data into said user interface of said secure terminal;

(g) processing said private input data within said Internet client software, said processing including wrapping using application Internet Protocols above the Transport and Internet Layers, wherein said private input data is transformed into private application data;

(h) processing said private application data within said Internet client software, said processing including encryption using security Internet Protocols above the Transport and Internet Layers, wherein said private application data is transformed into encrypted private application data;

(i) sending said encrypted private application data from said Internet client software to said PC interface software;

(j) sending said encrypted private application data from said PC interface software to said secure terminal device driver software, the sending using a transmission protocol over said short connection;

(k) sending said encrypted private application data from said secure terminal device driver software to said TCP/IP socket software; and (l) sending said encrypted private application data from said TCP/IP socket software to a remote Internet server, the sending using Internet Protocols at and below the Transport and Internet Layers;

wherein steps (f), (g) and (h) are performed in their entirety on said secure terminal;

wherein Internet Protocols at and below the Transport and Internet Layers operate on said personal computer, and Internet Protocols above the Transport and Internet Layers operate on said secure terminal;

wherein Internet Protocols at and below the Transport and Internet Layers, on said personal computer, are bridged to Internet Protocols above the Transport and Internet Layers, on said secure terminal, by said transmission protocol over said short connection; and wherein the method prevents a malware on said personal computer from observing said private input data.

2. The method of claim 1, wherein said application Internet Protocols above the Transport and Internet Layers include a protocol selected from the group consisting of:
(a) Hypertext Transfer Protocol (HTTP);
(b) Hypertext Markup Language (HTML);
(c) Post Office Protocol (POP);
(d) Simple Mail Transfer Protocol (SMTP); and
(e) Internet Message Access Protocol (IMAP).

3. The method of claim 1, wherein said security Internet Protocols above the Transport and Internet Layers include Secure Sockets Layer (SSL).

4. The method of claim 1, wherein said transmission protocol over said short connection further comprises the steps of:
(a) said PC interface software on said secure terminal providing, to said secure terminal device driver software on said personal computer, the destination address of said remote Internet server to which said encrypted private application data is being sent;
(b) said secure terminal device driver software on said personal computer acknowledging, to said PC interface software on said secure terminal, the destination address of said remote Internet server to which said encrypted private application data is being sent;
(c) said PC interface software on said secure terminal providing, to said secure terminal device driver software on said personal computer, said encrypted private application data being sent to said remote Internet server; and
(d) said secure terminal device driver software on said personal computer advising said PC interface software on said secure terminal that said encrypted private application data has been sent to said remote Internet server.

5. A method of securely receiving sensitive output data over the Internet using a secure terminal connected by a short connection to a personal computer, said method comprising the steps of:

(a) providing said personal computer which is connected to the Internet;

(b) providing said secure terminal which includes a user interface and memory, and which resists tampering, detects attempts to be tampered with, responds to said attempts by erasing data from said memory, and executes only authorized software;

(c) connecting said secure terminal by said short connection to said personal computer, wherein said secure terminal is a local peripheral of said personal computer;

(d) executing both TCP/IP socket software and secure terminal device driver software on said personal computer;

(e) executing both PC interface software and Internet client software on said secure terminal;

(f) receiving verifiable sensitive application data from a remote Internet server to said TCP/IP socket software, the receiving using Internet Protocols at and below the Transport and Internet Layers;

(g) receiving said verifiable sensitive application data from said TCP/IP socket software to said secure terminal device driver software;

(h) receiving said verifiable sensitive application data from said secure terminal device driver software to said PC interface software, the receiving using a reception protocol over said short connection;

(i) receiving said verifiable sensitive application data from said PC interface software to said Internet client software;

(j) processing said verifiable sensitive application data within said Internet client software, said processing including authentication using security Internet Protocols above the Transport and Internet Layers, wherein said verifiable sensitive application data is transformed into sensitive application data;

(k) processing said sensitive application data within said Internet client software, said processing including unwrapping using application Internet Protocols above the Transport and Internet Layers, wherein said sensitive application data is transformed into said sensitive output data; and (l) displaying said sensitive output data on said user interface of said secure terminal;

wherein steps (j), (k) and (l) are performed in their entirety on said secure terminal;

wherein Internet Protocols at and below the Transport and Internet Layers operate on said personal computer, and Internet Protocols above the Transport and Internet Layers operate on said secure terminal;

wherein Internet Protocols at and below the Transport and Internet Layers, on said personal computer, are bridged to Internet Protocols above the Transport and Internet Layers, on said secure terminal, by said reception protocol over said short connection; and wherein the method prevents a malware on said personal computer from modifying said sensitive output data.

6. The method of claim 5, wherein said reception protocol over said short connection further comprises the steps of:
(a) said PC interface software on said secure terminal providing, to said secure terminal device driver software on said personal computer, the source address of said remote Internet server from which said authenticated sensitive application data is to be received;
(b) said secure terminal device driver software on said personal computer acknowledging, to said PC interface software on said secure terminal, the source address of said remote Internet server from which said authenticated sensitive application data is to be received;
(c) said PC interface software on said secure terminal instructing said secure terminal device driver software on said personal computer to receive said authenticated sensitive application data from said remote Internet server; and
(d) said secure terminal device driver software on said personal computer providing, to said PC interface software on said secure terminal, authenticated sensitive application data received from said remote Internet server.

7. The method of claim 5, wherein said security Internet Protocols above the Transport and Internet Layers include Secure Sockets Layer (SSL).

8. The method of claim 5, wherein said application Internet Protocols above the Transport and Internet Layers include a protocol selected from the group consisting of:
(a) Hypertext Transfer Protocol (HTTP);
(b) Hypertext Markup Language (HTML);
(c) Post Office Protocol (POP);
(d) Simple Mail Transfer Protocol (SMTP); and
(e) Internet Message Access Protocol (IMAP).

\* \* \* \* \*